(12) United States Patent
Pietrowski et al.

(10) Patent No.: US 6,807,935 B2
(45) Date of Patent: Oct. 26, 2004

(54) INTAKE PIPE FOR AN INTERNAL COMBUSTION ENGINE COMPRISING AT LEAST TWO WELDED SHELLS

(75) Inventors: Herbert Pietrowski, Pleidelsheim (DE); Arthur Klotz, Remseck (DE); Ingo Koch, Ludwigsburg (DE); Matthias Teschner, Ludwigsburg (DE)

(73) Assignee: Mann & Hummel GmbH, Ludwigsburg (DE)

( * ) Notice: Subject to any disclaimer, the term of this patent is extended or adjusted under 35 U.S.C. 154(b) by 10 days.

(21) Appl. No.: 10/411,391

(22) Filed: Apr. 11, 2003

(65) Prior Publication Data

US 2003/0226535 A1 Dec. 11, 2003

Related U.S. Application Data

(63) Continuation of application No. PCT/EP01/11686, filed on Oct. 10, 2001.

(30) Foreign Application Priority Data

Oct. 14, 2000 (DE) .......................................... 100 51 116

(51) Int. Cl.[7] .............................................. F02M 35/10
(52) U.S. Cl. ........................... 123/184.24; 123/184.34; 123/184.42; 123/184.47
(58) Field of Search ....................... 123/184.21–184.61

(56) References Cited

U.S. PATENT DOCUMENTS 5,992,369 A 11/1999 Mehne
6,092,499 A 7/2000 Spannbauer
6,234,132 B1 * 5/2001 Kopec et al. .......... 123/184.34
6,321,708 B1 * 11/2001 Wehner et al. ......... 123/184.61
6,578,537 B2 * 6/2003 Klotz et al. ............ 123/184.21
6,581,561 B1 * 6/2003 Brodesser et al. ..... 123/184.34

FOREIGN PATENT DOCUMENTS

| EP | 0 568 560 B1 | 3/1997 |
| FR | 2 690 376 | 10/1993 |
| JP | 7-166875 | 6/1995 |
| JP | 9-189271 | 7/1997 |
| JP | 9-195869 | 7/1997 |
| JP | 10-193093 | 7/1998 |

OTHER PUBLICATIONS

International Search Report.

* cited by examiner

Primary Examiner—Marguerite J. McMahon
(74) Attorney, Agent, or Firm—Crowell & Moring LLP

(57) ABSTRACT

An intake pipe (10) for an internal combustion engine composed of shells (11a, 11b) in which the geometry of the joining surfaces (19) adopts an approximately stepped course in areas with a slight incline relative to to joining force (F). This produces areas with a greater or lesser inclination relative to a joint line (16) indicating the average inclination of the joining surfaces. This results in areas which can be welded with a high degree of stability because of their considerable incline towards the joining force. These areas can then support areas which are less inclined towards the joining force. This allows the shells (11a, 11b) to have strongly curved joining surfaces, which increases the geometric design freedom of the intake pipe and, in particular, makes it possible to manufacture intake pipes with strongly curved intake channels constructed from just two shells.

7 Claims, 2 Drawing Sheets

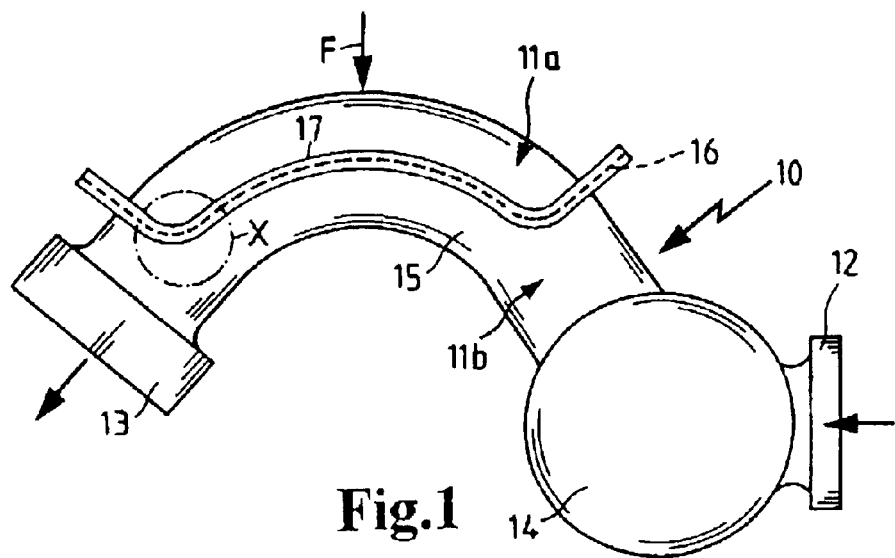
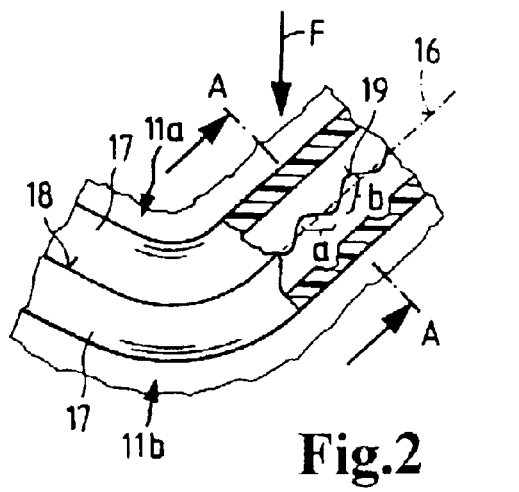
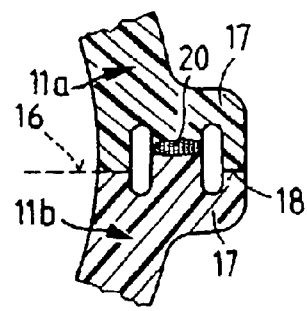
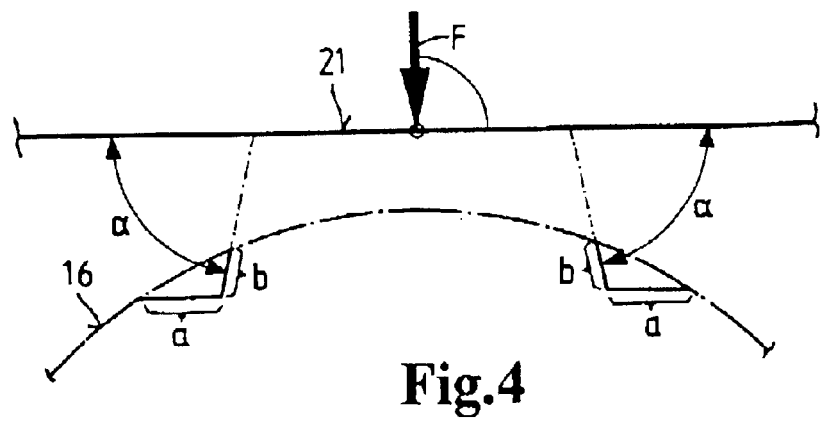

INTAKE PIPE FOR AN INTERNAL COMBUSTION ENGINE COMPRISING AT LEAST TWO WELDED SHELLS

CROSS REFERENCE TO RELATED APPLICATIONS

This application is a continuation of international patent application no. PCT/EP01/11686, filed Oct. 10, 2001, designating the United States of America, and published in German as WO 02/33243, the entire disclosure of which is incorporated herein by reference. Priority is claimed based on Federal Republic of Germany patent application no. DE 100 51 116.3, filed Oct. 14, 2000.

BACKGROUND OF THE INVENTION

The invention relates to a intake pipe for an internal combustion engine comprising at least two shells that are welded together. Intake pipes of the aforementioned type are known, for example, from EP 568,560. According to FIG. 15 of this document, the depicted intake pipe is made of two shells, which form the intake channels of the intake pipe. The joining surfaces for welding the shells together are provided within welding edges 425, 426. They form a joint line 420, which in the depicted example is identical with the joining surfaces.

The figure also shows the direction of force applied by the welding tool. The joint line 420 is configured in such a way that the angle of inclination of the joint line does not substantially exceed a 60° angle relative to a plane that is perpendicular to the welding force. This is to achieve a reliable weld joint along the entire joining surface. The inclination of the joint line relative to the applied welding force may therefore not be substantially less than 30°.

The configuration of the joint line protected by EP 568, 560 ensures the functioning of the intake pipe to the extent that the intake pipe can withstand the pressure conditions that occur within the intake pipe. However, the depicted configuration limits the freedom of design regarding the geometry of the intake pipe. The curved intake channels can be produced with two shells only up to a certain angle of curvature. A larger angle of curvature of the joint line can no longer be adequately adapted to the curvature of the intake channel, and undercuts would be created as a result.

SUMMARY OF THE INVENTION

It is an object of the invention to provide an improved intake pipe for an internal combustion engine comprised of at least two shells which are welded together.

Another object of the invention is to provide an intake pipe for an internal combustion engine comprised of at least two shells welded together which achieves increased design flexibility while at the same time assuring durability and reliability of the welds which join the shells.

A further object of the invention is to provide a intake pipe whose shells can be optimally adapted to the required geometric conditions of the housing.

These and other objects have been achieved in accordance with the present invention by providing an intake pipe for an internal combustion engine, the intake pipe comprising a housing having an inlet and at least one cylinder outlet for combustion air and including a plenum from which at least one intake channel branches off to the respective outlet for each cylinder of the internal combustion engine, wherein the housing is formed by at least two shells that are welded together at mating joining surfaces which define a joint line between the shells, the joint line having sections with differing inclinations relative to the direction of a joining force applied by a welding tool, and wherein, at least in a section of the joint line that has the smallest inclination relative to the direction of the joining force, the inclination of the joining surfaces alternately has a greater inclination than the joint line and then a smaller inclination than the joint line.

The intake pipe according to the invention comprises two shells that are welded together. Suitable welding processes for welding the shells include, e.g., vibration welding and/or ultrasonic welding. For the welding procedure, the intake pipe is inserted into suitable welding tools that will adequately support the intake pipe shells. These welding tools also apply a welding force to the parts to be joined.

To facilitate connection of the shells of the intake pipe to each other, the shells are provided with joining surfaces. These joining surfaces define a joint line, which has sections of different inclinations relative to the direction of the joining force. They can be adjacent linear sections without curvature. Generally, however, the joint line will be continuously curved. This is particularly advantageous if the shells together form curved intake channels of the intake pipe and their curvature follows the curvature of the intake channels at least in sections. The joint line results from the average inclination of the joining surfaces in the individual sections. In other words, the joint line deviates from the joining surfaces in sections that comprise an abrupt change in the inclination of the joining surfaces. In continuous sections of the joining surfaces, the joining surfaces are largely identical with the joint line.

The intake pipe according to the invention is characterized in that, at least in a section of the joint line where the joint line has the smallest inclination relative to the direction of the joining force, the inclination of the joining surfaces alternately adopts a greater and then a smaller inclination. This alternation between greater and smaller inclination can occur once or several times within this section.

The section of the joint line with the smallest inclination is the one where the attainable strength values of the weld seam must be viewed as the most critical. The configuration of the joining surfaces according to the invention is a way to assure that adequate strength of the weld seam is also achieved in these areas. This is achieved by the fact that the areas with a greater inclination relative to the joining force result in more favorable strength values of the weld seam than would be possible with joining surfaces that are identical with the joint line. In these areas, the joint line has a smaller inclination relative to the direction of the welding force, which would result in more critical values. Due to the adequate strength of the weld seam in the area of the joining surfaces that have a greater angle of inclination than the joint line, it is possible to accept the reduced strength of the sections of the joining surfaces whose angle of inclination relative to the welding force is smaller than that of the joint line. These weaker areas are relieved by the strong sections with respect to compression loads and must merely satisfy a sealing function.

The described configuration of the joining surfaces allows greater geometric freedom in the design of the shells of the intake pipe. It is possible, in particular, to obtain joint lines whose inclination relative to the joining force can also be substantially smaller than 30°. In particular, even angles of less than <24° can be achieved. Relative to a plane that is perpendicular to the welding force, maximum angles of inclination of the joint line of substantially more than 60°, especially more than 66°, are created.

One specific embodiment of the invention is obtained if in a projection, the joint line has a constant curvature. This projection results from the viewing direction onto the joint line from a certain perspective. If the joint line extends, for example, along the curvature of the intake channels of the intake pipe, the described projection results, for instance, if the viewing direction onto the intake channels is perpendicular to the curvature. Thus, the welding force is perpendicular to this viewing direction. The welding force is directed in such a way that at the end of the projection, which coincides with the end of the joint line, there is a section of the joint line, at least on one side, where the inclination relative to this force is smallest. In this area, the above-described stepped course of the joining surfaces around the joint line is provided. In this configuration of the joining surfaces, this results in sections in the center area of the joint line whose inclination relative to the joining force is non-critical, so that in these areas the joint line can be identical with the joining surfaces.

An especially advantageous embodiment of the invention is obtained if the areas of the joining surfaces having a smaller inclination than the joint line are at least approximately perpendicular to the direction of the joining force. If the joining surfaces are perpendicular to the joining force, the resulting strength of the weld seam is optimal. These areas can then absorb the loads occurring along the weld seam particularly well. As a result the sections of the joining surfaces with the strongest inclination, which alternate with those of a smaller inclination, can adopt angles of inclination of less than 24° relative to the joining force.

Another specific embodiment of the joining surfaces in the area where their course deviates from that of the joint line, is a stepped configuration. The steps can have rounded corners to achieve an optimum welding result even in the area of the change in inclination. The stepped course provides optimal protection against failure of the areas with the smaller inclination relative to the joining force.

According to another variant, a weld rim can hide the change in the inclination of the joining surfaces. This improves the visual appearance of the intake pipe.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings, in which:

FIG. 1 is a side view of a intake pipe formed of two shells;

FIG. 2 is an enlarged detail view of the area X of FIG. 1;

FIG. 3 is a sectional view taken along line A—A of FIG. 2;

FIG. 4 is a schematic representation of a joint line corresponding to the intake pipe of FIG. 1 indicating the joining force;

DETAILED DESCRIPTION OF PREFERRED EMBODIMENTS

Figure 5:
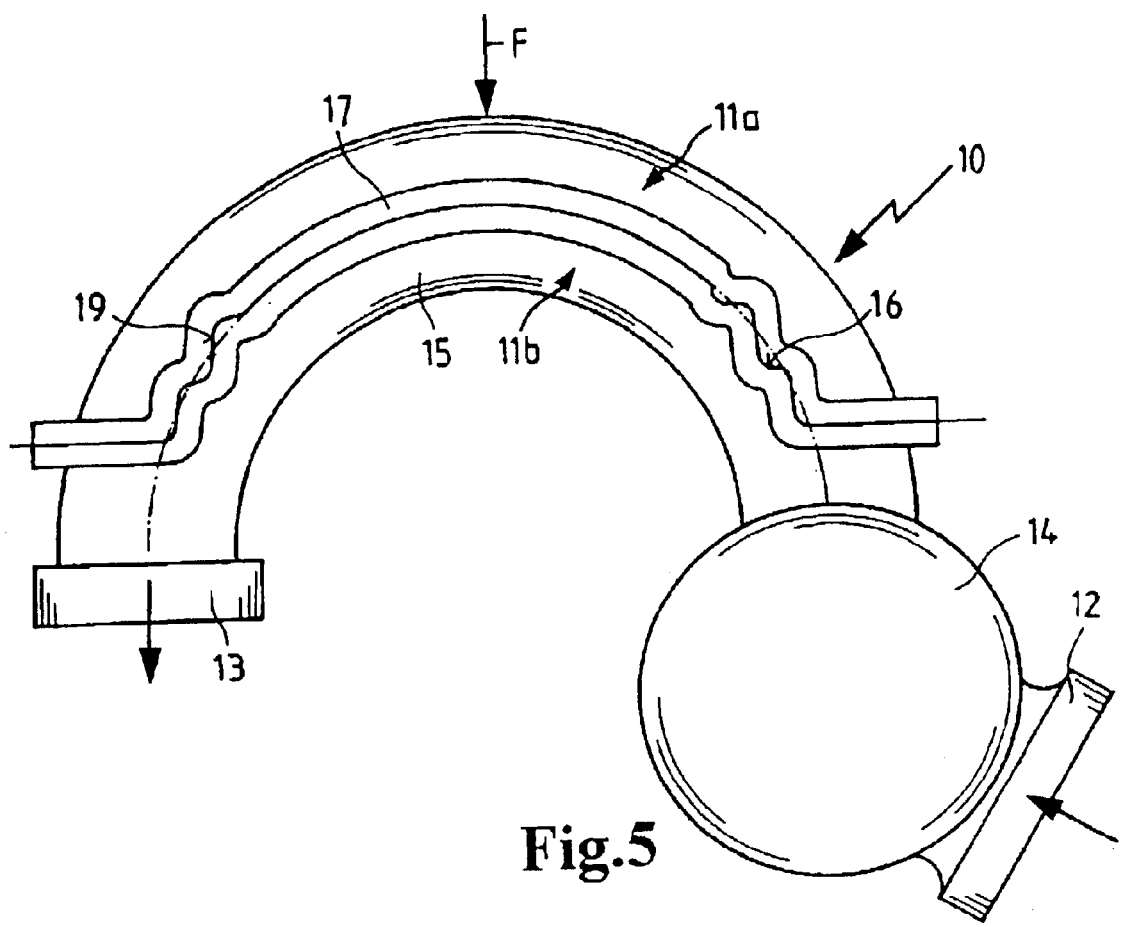
FIG. 5 is a side view of a intake pipe in which a section of the joining surface and weld rim has a stepped course.

FIG. 1 shows an intake pipe comprising a housing 10 made of two shells 11a and 11b. Shell 11b forms the basic body, which has an inlet 12 and a plurality of outlets 13 for the combustion air, only one outlet being shown. Shell 11b also forms a plenum 14. The two shells 11a, 11b together form intake channels 15.

A joint line 16 extending within a weld rim 17 defines the interengagement of the shells 11a, 11b. The weld seam, invisible in FIG. 1, between the shells 11a and 11b extends within the weld rim 17.

A detail of the weld rim 17 is shown in FIG. 2. The weld rim 17 is formed partly by the shell 11a and partly by the shell 11b, and a parting line 18 results between these two parts of the weld rim. In this figure, the weld rim is partly cut away. The cut-away portion shows a joining surface 19 where the weld seam is formed between the shells 11a, 11b. The joining surface extends in wave shape around the joint line 16. This results in areas with a large inclination (a) and areas with a small inclination (b) relative to the direction of the welding force F. The areas (a) produce a great weld strength and thereby ensure the compression strength of the intake pipe. The areas (b) merely produce a sealing effect between the shells 11a, 11b to ensure that the intake pipe is sealed relative to the surrounding environment.

The structure of the weld rim 17 is shown in FIG. 3. It can be seen how the weld rim 17 hides the change in the inclinations of the joining surfaces relative to the joint line. This figure also shows that the joint line 16 extends in the plane of the parting line 18. This is not structurally necessary, however. The joining surfaces lie in a melt zone 20, which makes it possible for the shells 11a, 11b to be welded together. This melt zone and thus also the weld surfaces, which are no longer visible once the intake pipe has been welded, lie outside the joint line 16.

The way the invention works can be explained with reference to the schematic representation shown in FIG. 4. The intake pipe is not shown here, only the joint line 16 that defines the engagement of the two shells. The joint line in this representation is uniformly curved. In the end areas of the curvature, the joining surfaces 19 deviate from the joint line. A step comprising areas (a) and (b) results on either side of the joint line 16. These areas deviate from the joint line. The area (b), because of its small inclination relative to the joining force F, would not produce sufficient strength for the intake pipe. The adjoining area (a), which has a large angle of inclination relative to the joining force F, however, ensures the required weld strength for the overall component. The area (a) lies substantially parallel to a plane 21, which extends at a right angle to the direction of the welding force. This geometry makes it possible to obtain optimal strength values for the weld seam. The area (b) has a 77° angle relative to the plane 21. The effective contact pressure for producing the weld seam in this area is therefore reduced by a factor of cos 77°. If the entire weld line in this area were provided with an inclination of this magnitude, the effective contact pressure would not be sufficient to obtain the required pressure stability of the intake pipe.

FIG. 5 shows an intake pipe that is constructed similarly to that depicted in FIG. 1. Corresponding components are identified by the same reference numerals. The intake channel 15 causes the intake air to be redirected by 180° between the plenum 14 and the outlets 13. In contrast to the intake pipe depicted in FIG. 1, however, the weld rim 17 does not follow the joint line 16, but instead follows the actual joining surfaces 19. In the end areas of the joint line 16, which have a small inclination relative to the joining force F, one can see the stepped course of the joining surfaces, which has already been described with reference to FIG. 4.

Figure 6:
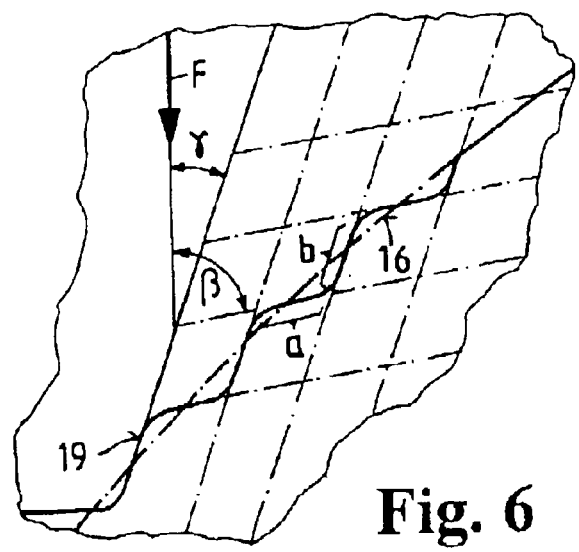
FIG. 6 is a schematic illustration of the geometric course of the joining surfaces in the area of the joint line having the largest inclination.

FIG. 6 illustrates one possible course of the joining surfaces 19 in an area of the joint line 16 that has a small inclination relative to the joining force F. In this area, the joining surfaces adopt a stepped course with rounded corners. The sides of the steps are inclined alternately at a 20° angle and at an 80° angle, relative to the direction of the joining force. This results in the previously described areas (a) and (b) in the joining surface 19 in order to produce the above-described effects regarding the overall strength of the weld seam.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An intake pipe for an internal combustion engine, said intake pipe comprising a housing having an inlet and at least one cylinder outlet for combustion air, said housing including a plenum from which at least one intake channel branches off to a respective said outlet for each cylinder of the internal combustion engine, wherein said housing is formed by at least two shells that are welded together at mating joining surfaces which define a joint line between the shells, said joint line having sections with differing inclinations relative to the direction of a joining force applied by a welding tool, and resulting from the average inclination of the joining surfaces in the individual sections, and wherein, at least in a section of the joint line that has the smallest inclination relative to the direction of the joining force, the inclination of the joining surfaces alternately has a greater inclination than the joint line and then a smaller inclination than the joint line.

2. An intake pipe according to claim 1, wherein the joint line of the joining surfaces has a continuous curvature in at least one projection, and said curvature terminates at least at one end of the projection in said section of the joint line having the smallest inclination relative to the direction of the joining force.

3. An intake pipe according to claim 1, wherein the sections of the joining surfaces with the greatest inclination have an angle of inclination of less than 24° relative to the direction of the joining force.

4. An intake pipe according to claim 1, wherein the areas of the joining surfaces with a smaller inclination than the joint line are substantially perpendicular to the direction of the joining force.

5. An intake pipe according to claim 1, wherein the joining surfaces have a stepped configuration where their course differs from that of the joint line.

6. An intake pipe according to claim 1, wherein a weld rim hides the change in the inclinations of the joining surfaces relative to the joint line.

7. An intake pipe according to claim 1, wherein the joining surfaces of the shells of the intake pipe at least partially extend to the intake channels, and the joint line proceeds along the curvature of the intake channels, so that in the area of the joint line, the intake channels are formed by the two shells.

* * * * *